(12) United States Patent
Lefebvre et al.

(10) Patent No.: US 7,517,118 B2
(45) Date of Patent: Apr. 14, 2009

(54) CABLE ORGANIZER

(75) Inventors: Dennis A. Lefebvre, Kitchener (CA); David L. Bannon, Kitchener (CA)

(73) Assignee: 1568519 Ontario Limited, Kitchener, Ontario (CA)

(*) Notice: Subject to any disclaimer, the term of this patent is extended or adjusted under 35 U.S.C. 154(b) by 110 days.

(21) Appl. No.: 11/456,884

(22) Filed: Jul. 12, 2006

(65) Prior Publication Data
US 2007/0012480 A1 Jan. 18, 2007

Related U.S. Application Data

(60) Provisional application No. 60/698,495, filed on Jul. 13, 2005.

(51) Int. Cl.
*F21V 21/00* (2006.01)

(52) U.S. Cl. .................... 362/391; 362/457; 362/458

(58) Field of Classification Search ............. 362/391, 362/649–650, 249, 802, 196, 189, 101, 655–656, 362/640, 368, 376–378, 457–458, 138–144; 248/49, 51, 68.1, 65, 223.41, 222.12, 225.11, 248/231.81; 24/1, 522–524
See application file for complete search history.

(56) References Cited

U.S. PATENT DOCUMENTS

| | | | |
|---|---|---|---|
| 3,696,920 A | 10/1972 | Lahay | |
| 3,739,077 A | 6/1973 | Winkelman | |
| 4,039,818 A * | 8/1977 | Hickman | 362/139 |
| 4,272,136 A | 6/1981 | Sengua | |
| D263,624 S | 3/1982 | Stenzler et al. | |
| 4,721,268 A | 1/1988 | Lerner et al. | |
| 4,758,924 A | 7/1988 | Dillon et al. | |
| 4,917,465 A | 4/1990 | Conner et al. | |
| 5,165,161 A | 11/1992 | Cerquone et al. | |
| 5,372,225 A | 12/1994 | Joynes et al. | |
| 6,036,550 A | 3/2000 | Naganawa et al. | |
| 6,227,502 B1 | 5/2001 | Derman | |
| 6,227,719 B1 | 5/2001 | Aoki et al. | |
| 6,345,873 B1 | 2/2002 | Kim | |
| 6,406,327 B1 | 6/2002 | Soon | |
| 6,547,585 B2 | 4/2003 | Bradley et al. | |
| 6,629,615 B2 | 10/2003 | Kim | |
| 6,702,237 B2 | 3/2004 | Rubenstein et al. | |
| 6,854,863 B2 * | 2/2005 | Wu | 362/292 |
| 6,903,266 B1 | 6/2005 | Luciere | |
| 7,077,688 B2 * | 7/2006 | Peng | 439/471 |
| 2003/0185006 A1 * | 10/2003 | Gordon et al. | 362/249 |
| 2005/0109884 A1 | 5/2005 | Wylie | |

FOREIGN PATENT DOCUMENTS

WO PCT/CA2006/001150 7/2006

* cited by examiner

*Primary Examiner*—Jong-Suk (James) Lee
*Assistant Examiner*—Robert May (57) ABSTRACT

An apparatus for organizing a number of cables with respective bodies connected to ends thereof for use with an electronic device with a back wall. The back wall has a number of connectors with which the ends of the cables are connectable. The apparatus includes a body having a number of apertures for positioning each cable respectively in a predetermined arrangement. The apparatus also includes one or more reflective surfaces for use in inserting the ends of the cables in the connectors respectively on the back wall.

12 Claims, 6 Drawing Sheets

CABLE ORGANIZER

This application claims the benefit of U.S. Provisional Application No. 60/698,495, filed Jul. 13, 2005.

FIELD OF THE INVENTION

This invention is related to an apparatus for organizing a plurality of cables for use with an electronic device.

BACKGROUND OF THE INVENTION

Electronic devices such as personal desktop computers, home theatres and other multimedia systems typically include a multitude of cables to connect the electronic device to peripheral components such as speakers, controllers, and other components. For instance, in the case of a desktop computer, the result is a series of cables that are received in connectors on a back wall of the main processor housing and connect the electronic device to components including the monitor, the keyboard and the mouse.

The difficulty with this configuration is that the back wall and the connectors typically are not readily accessible by a user. In these circumstances, the user has difficulty identifying and locating the appropriate connector for any particular cable.

In many circumstances, such as when installing new hardware or making changes to existing configurations, it is necessary to connect or disconnect the cables of the electronic device. Where the user can easily reposition the main processor housing so that the back wall is directly observable by the user, making the connections and disconnections required is straightforward. However, repositioning of the electronic device is often inconvenient, difficult or impractical.

There is therefore a need for an apparatus for organizing cables connecting electronic devices to peripheral components.

SUMMARY OF THE INVENTION

In its broad aspect, the invention provides an apparatus for organizing a number of cables with respective bodies connected to ends thereof for use with an electronic device with a back wall. The back wall has a number of connectors with which the ends of the cables are connectable. The apparatus includes a body having a number of apertures for positioning each cable body respectively in a predetermined arrangement. Also, the apparatus includes reflective surfaces for use in inserting the ends of the cables in the connectors respectively on the back wall.

In another aspect, the apparatus additionally includes one or more light sources for use with the reflective surface to illuminate a portion (or more) of the back wall, for facilitating the connection of the ends with the connectors.

In another aspect, each light source comprises a light source mounting element receivable in one of the apertures.

In another of its aspects, the apparatus additionally includes a base for locating the body in a preselected position relative to the electronic device. The base includes one or more legs, each with one or more mating portions receivable in one of the apertures.

In another of its aspects, the apparatus additionally includes a number of fasteners. Each fastener is adapted for securing an element selected from the group consisting of one of the cable bodies, light sources mounting elements, and one or more mating portions in at least one of said apertures.

The body additionally includes a number of grooves. Each groove is positioned adjacent to and associated with each aperture respectively. Also, each fastener includes a latch member, and each latch member is slidably receivable in the grooves associated with each aperture respectively.

In another aspect, each latch member is slidably movable in at least two of the grooves associated with one of the apertures between an open position, in which the aperture is open to permit insertion and removal of the element, and a closed position, in which the latch member at least partially obstructs the aperture.

In yet another aspect, each latch member is in a fully closed position when each latch member prevents insertion and removal of the element in the aperture with which the latch member is associated.

In another aspect, each of the grooves comprises a first end opening into the aperture with which the groove is associated and a second end disposed distal to the apertures respectively.

In another aspect, each second end includes a shallow portion, for engaging each said latch member respectively, to hold the latch member in a position selected from the group consisting of the open position and the fully closed position.

In another of its aspects, the invention includes a kit for organizing cables associated with an electronic device. The kit includes a body having a reflective surface and a number of apertures for receiving and locating the cables in a predetermined arrangement. Also, the kit includes one or more light assemblies receivable in at least one of the apertures for illuminating at least a portion of the electronic device and for use with the reflective surface to facilitate the connection of the cables to the electronic device. The apparatus also includes one or more bases including a mating portion receivable in one or more of the apertures for supporting the body in a predetermined position.

BRIEF DESCRIPTION OF THE DRAWINGS

The invention will be better understood with reference to the attached drawings, in which.

DETAILED DESCRIPTION

Figure 1:
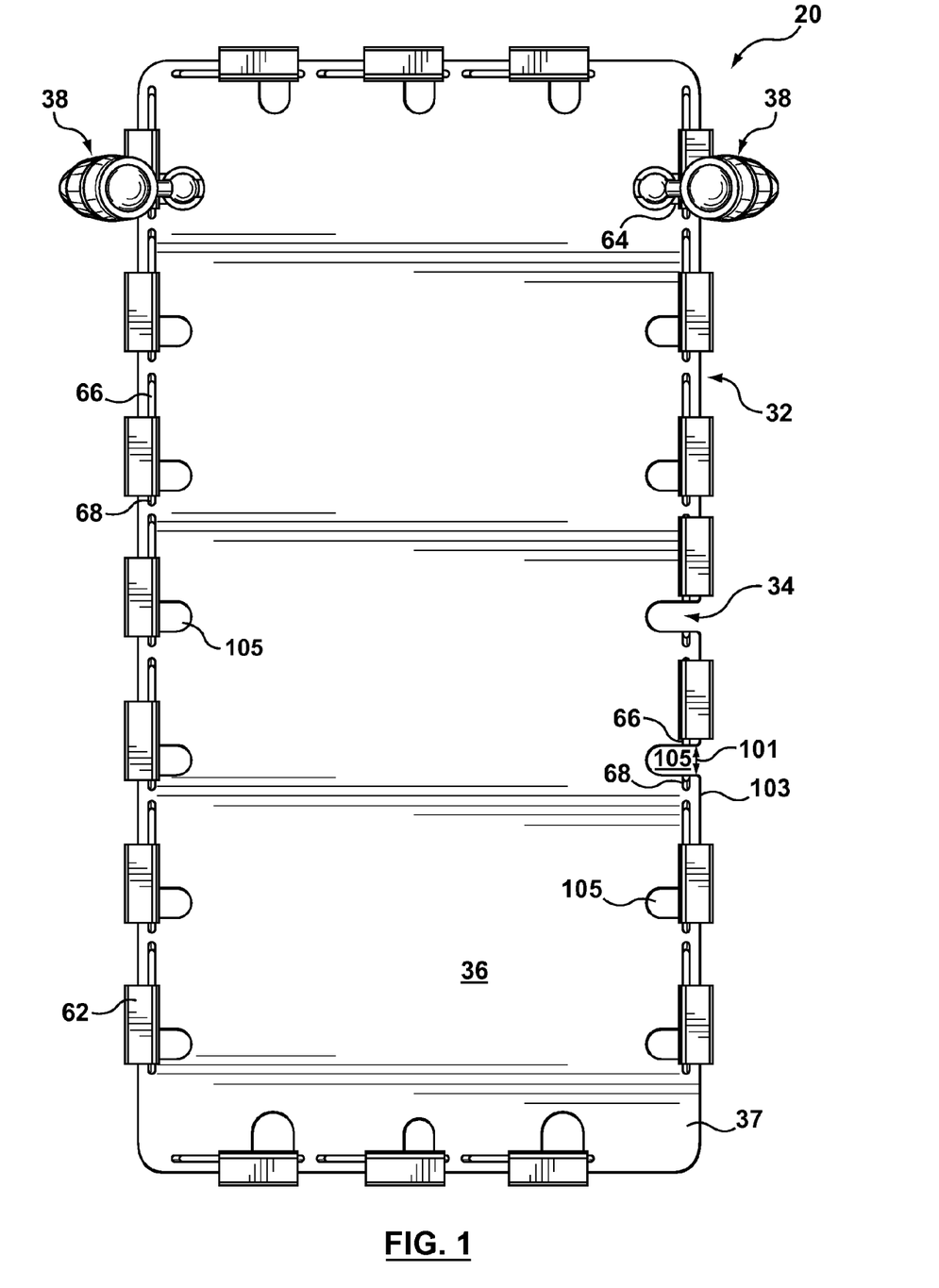
FIG. 1 is a front view of an embodiment of an apparatus of the invention showing a front side thereof.
Figure 6:
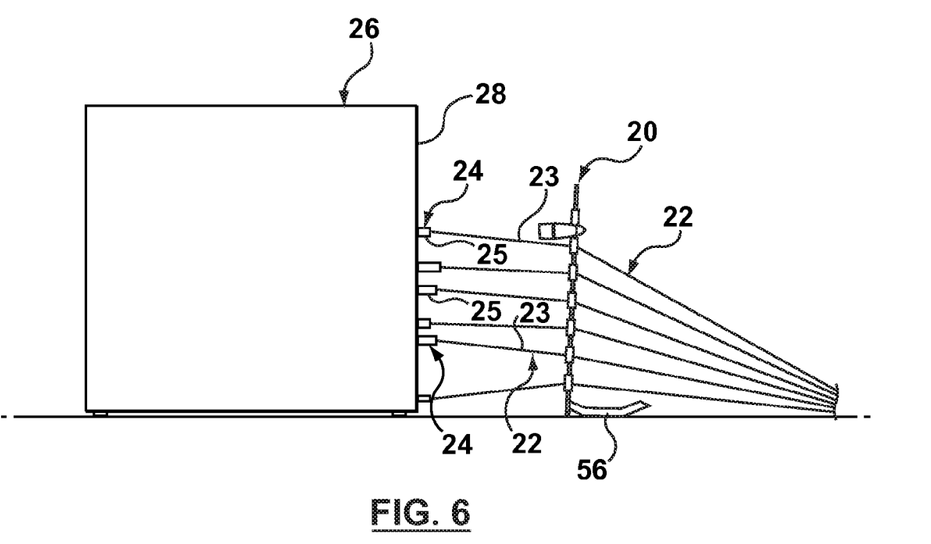
FIG. 6 is a side view of an electronic device with an embodiment of the apparatus of the invention positioned behind the back wall of the electronic device, drawn at a smaller scale.

Reference is first made to FIGS. 1-3, 3A, 3B, 3C, and 6 to describe an embodiment of an apparatus in accordance with the invention indicated generally by the numeral 20. As can be seen in FIG. 6, the apparatus 20 is for organizing a plurality of cables 22 with respective ends 24 for use with an electronic device 26 with one or more back walls 28. The back wall 28 has connectors (not shown) positioned thereon in which the ends 24 are connectable. The apparatus 20 includes a body 32 with apertures or slots 34 for positioning each cable 22 respectively in a predetermined arrangement (FIGS. 1, 6). Also, the apparatus preferably includes one or more reflective surfaces 36 for use in inserting the ends 24 of the cables 22 in the connectors respectively on the back wall 28. The reflective surface is preferably disposed on a front side 37 of the body 32.

As will be described, it is preferred that the apparatus 20 includes one or more light sources 38 for use with the reflective surface 36 to illuminate at least a portion of the back wall 28, for facilitating the connection of the ends 24 with the connectors 30.

Figure 4:
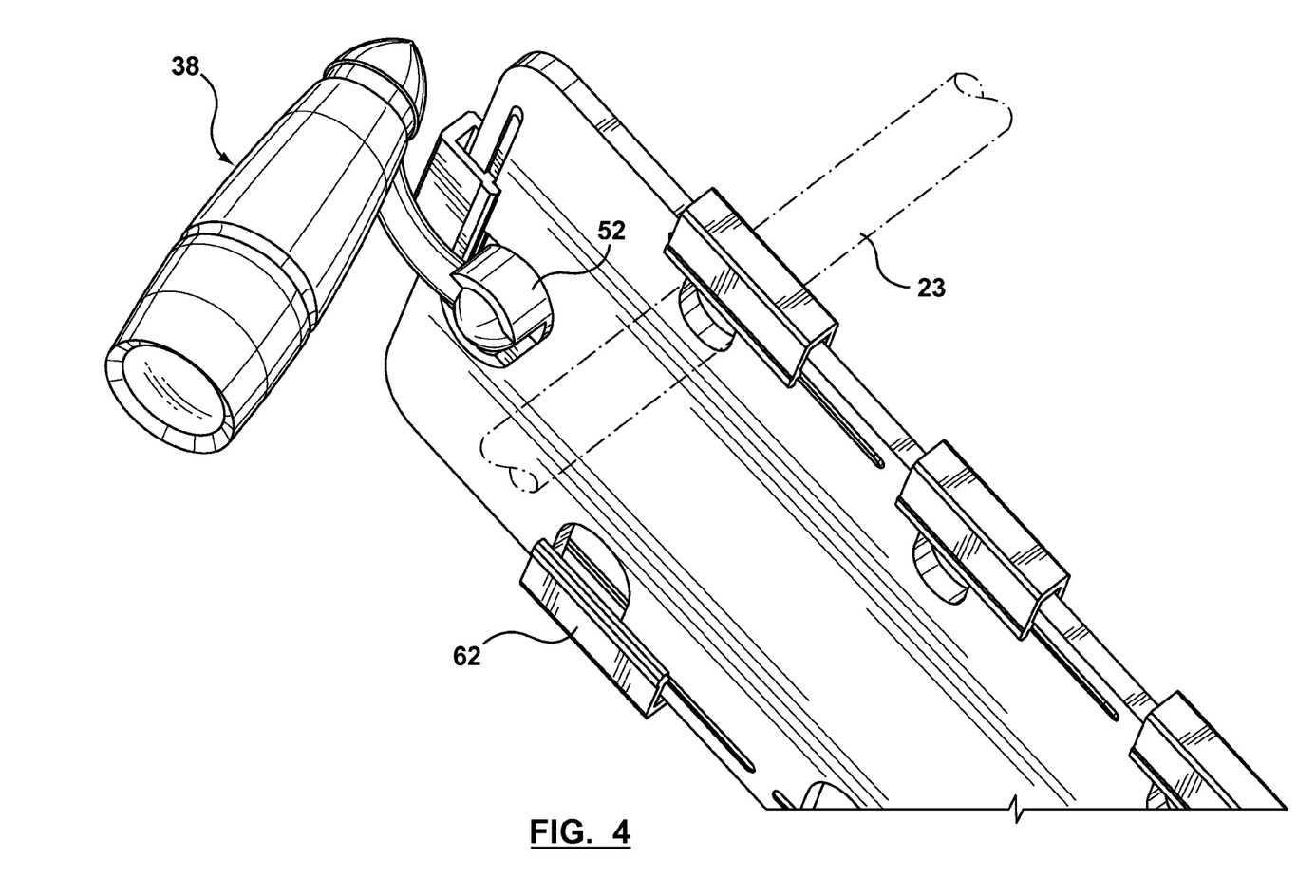
FIG. 4 is an isometric view of the apparatus of FIG. 3, with a cable in an aperture and the latch member in a fully closed position, drawn at a smaller scale.
Figure 5:
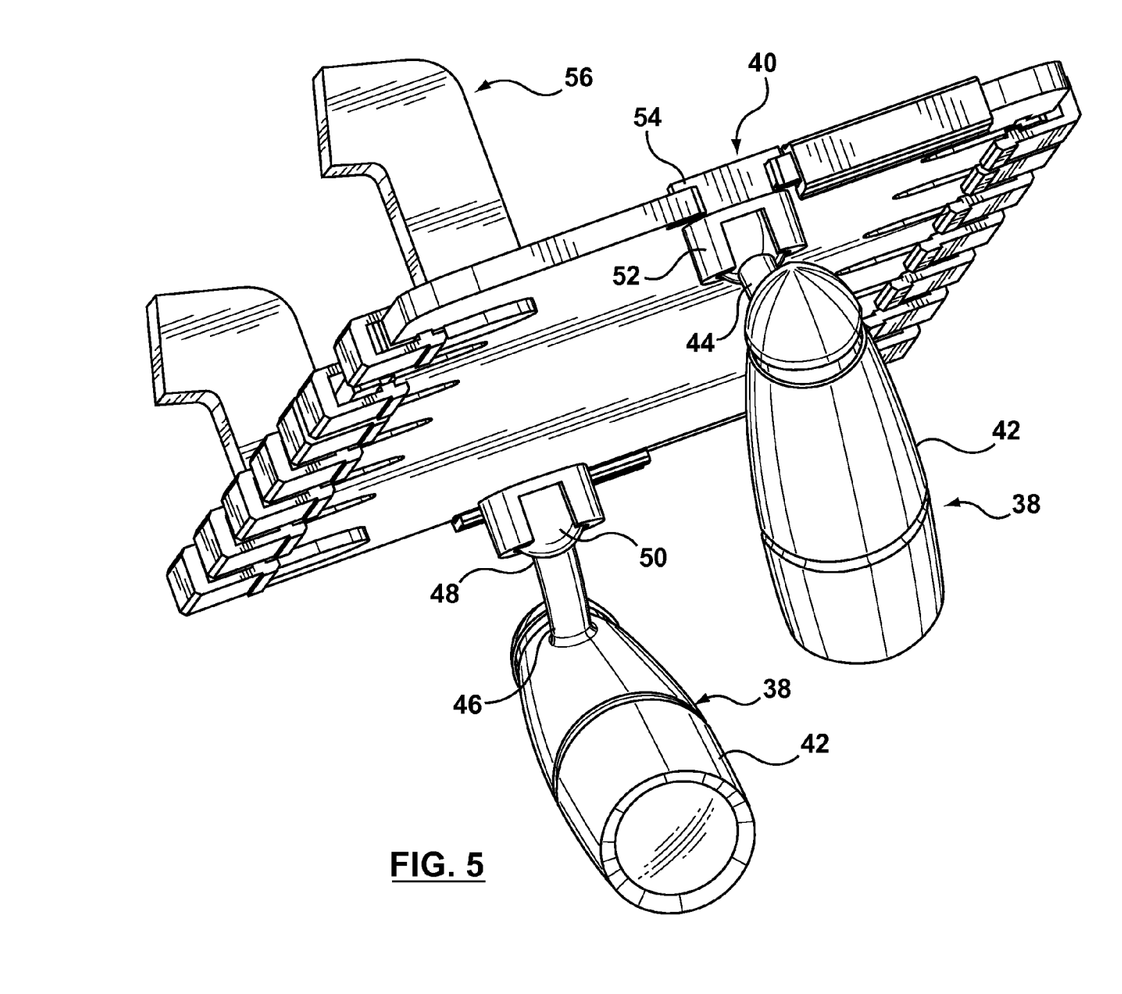
FIG. 5 is another isometric view of the apparatus of FIGS. 3 and 4, drawn at a smaller scale.

The light source 38 preferably includes a light source mounting element 40 (FIG. 5) which is receivable in the aperture 34. As can be seen in FIGS. 1, 2, 3, and 4, the light source 38 preferably is a light source assembly including a housing 42 in which an electric bulb and an electric power source (e.g., a battery) (not shown) are located and operatively connected together, as is known in the art. Also, the housing 42 preferably includes a switch mechanism 43 for activating and de-activating the light bulb, as is known in the art. Preferably, the light source assembly 38 also includes an arm 44 connected to the housing 42 at a proximal end 46 of the arm 44. The arm 44 extends between the proximal end 46 and a distal end 48, and includes a ball portion 50 which is positioned at the distal end 48. The mounting element 40 includes a socket portion 52 in which the ball portion 50 is rotatably receivable, to permit a wide range of movement of the housing 42 relative to the light source mounting element 40. As can be seen in FIG. 5, the mounting element 40 also includes a cooperating portion 54 (FIG. 5) attached to the ball portion 50. The cooperating portion 54 is adapted to be slidably received in the aperture 34, as will be described.

As can be seen in FIGS. 5 and 6, the apparatus 20 also includes one or more bases 56 for locating the body 32 in a preselected position relative to the electronic device 26. Preferably, the base 56 includes one or more legs 58 and one or more mating portions 60. Each mating portion 60 is connected to one or more legs 58, and each mating portion 60 is receivable in the aperture 34.

As shown in FIG. 6, each cable 22 typically includes a cable body 23 extending to the end 24, and a plug portion 25 positioned at or adjacent to the end 24. The plug portion 25 abuts the back wall 28 when the cable end 24 is received in the connector therefor.

Preferably, the apparatus 20 also includes a plurality of fasteners 62. Each fastener 62 is adapted for securing an element 64 in the aperture 34, as will be described. Such element is, for example, the cable body 23, the light source mounting element 40, or the mating portion 60 of the base 56. Preferably, the element 64 is selected from the group consisting of the cable body 23, the light source mounting element 40, and the mating portion 60. It is preferred that each aperture 34 is adapted to receive each such element 64. As will be appreciated by those skilled in the art, where all of the apertures 34 are substantially the same size, and all of the elements 64 are receivable in each aperture 34, certain advantages are provided. For instance, the cooperating portion 54 of the light source mounting element 40 preferably is positionable in such of the apertures 34 as are selected by a user (not shown). Also, the bases 56 are positionable as required, with the mating portions 60 being positioned in such apertures 34 as necessary to achieve a particular desired result. As can be seen in FIGS. 1-3, 4, and 5, in each case, the fastener 62 secures the element 64 in place once the element 64 is received in the aperture 34. For example, the apparatus 20 is shown in a "portrait" type of arrangement in FIG. 2, with the bases 56 positioned at a short side 92 of the body 32 and light source assemblies 38 positioned on long sides 94 of the body 32, distal to the bases 56. However, a "landscape" type of arrangement is shown in FIG. 5. It will be understood that the orientation of the body 32 (i.e., whether portrait or landscape) would be at the user's discretion. However, the body 32 is conveniently used in portrait orientation when the electronic device's back wall 28 is positioned vertically (as in FIG. 6), and the landscape orientation is conveniently used when the back wall 28 is generally horizontally positioned.

Figure 2:
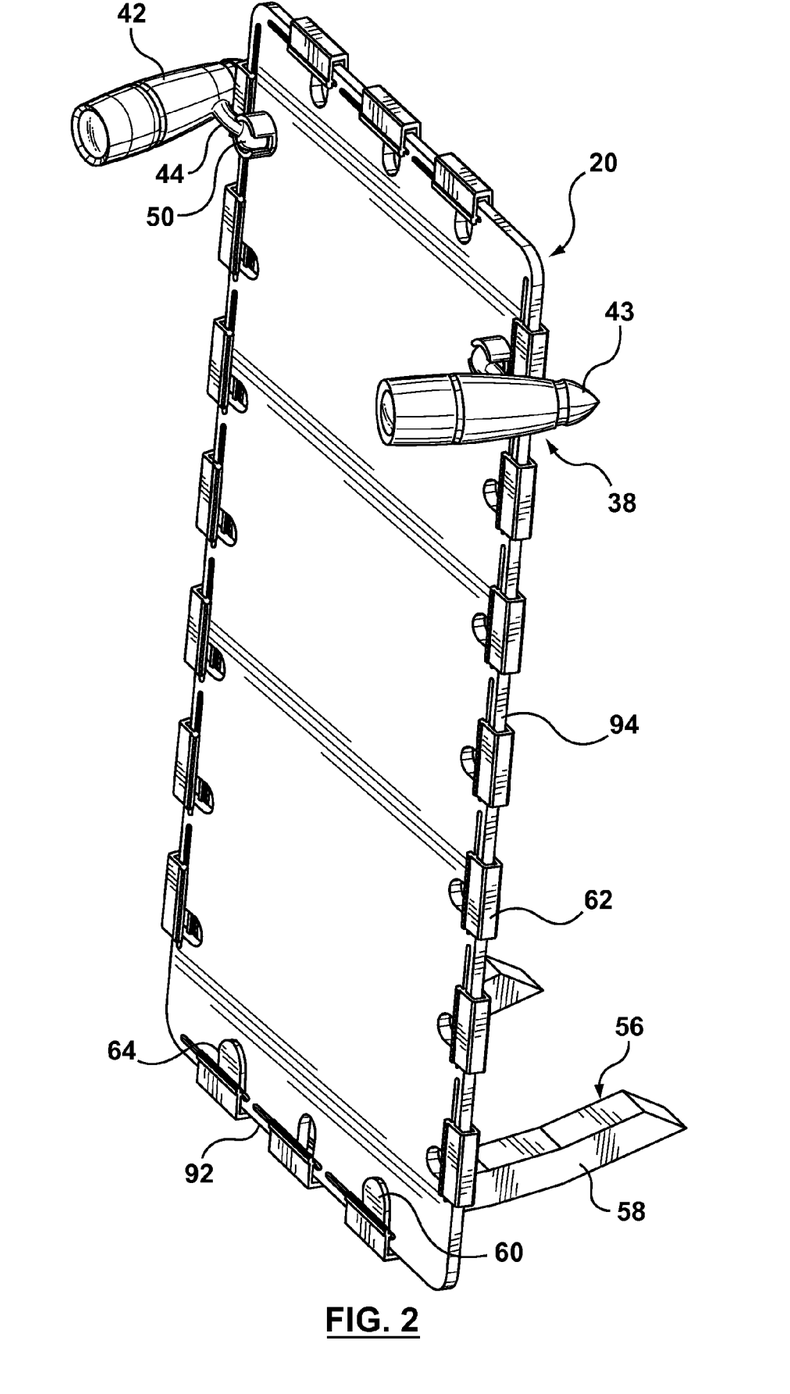
FIG. 2 is an isometric view of the apparatus of FIG. 1.

It is preferred that the body 32 is substantially rectangular in shape, however, the body 32 can have virtually any shape desired. Preferably, the body 32 includes a rear side 96 (FIGS. 3A, 3B, 3C) positioned opposite to the front side 37. As shown in FIGS. 1 and 2, the body 32 preferably includes three apertures positioned (with predetermined intervals between them) along each short side 92 and seven apertures positioned (with predetermined intervals between them) along each side 94. However (and as shown in FIGS. 3, 4, and 5), as will be apparent to those skilled in the art, other arrangements of the apertures 34 in the body 32 are possible.

It is also preferred that the body 32 additionally includes a plurality of grooves 66, 68. As shown in FIGS. 1 and 3, each groove 66, 68 is positioned adjacent to and associated with each aperture 34 respectively, as will be described. Also, each fastener 62 preferably is a latch member. Each latch member 62 preferably is slidably receivable in the grooves 66, 68, which are associated with each aperture 34 respectively, as will also be described.

Figures 3, 3C:
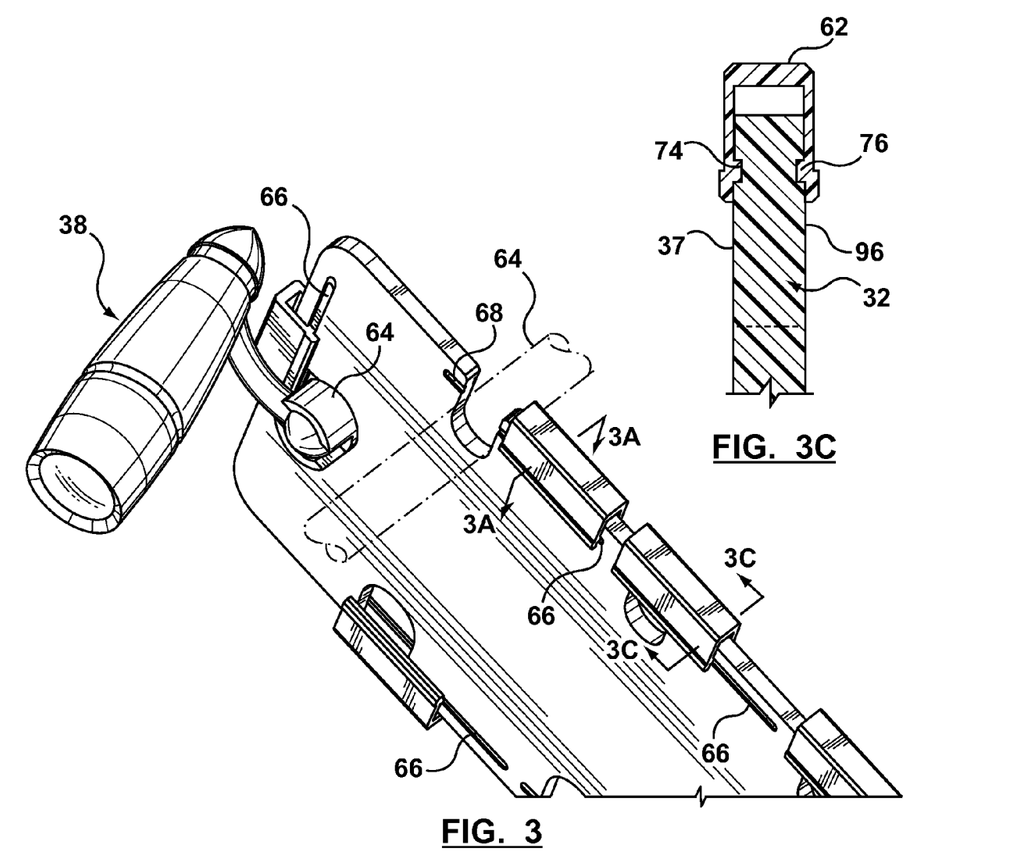
FIG. 3 is an isometric view of a portion of an alternative embodiment of the apparatus of the invention.
FIG. 3C is a cross-section showing the latch member positioned in grooves.

As can be seen in FIG. 3, for example, the aperture 34 has grooves 66, 68 positioned on either side of the aperture 34. The grooves 66, 68 are also shown in FIGS. 3A and 3B.

Figure 3A:
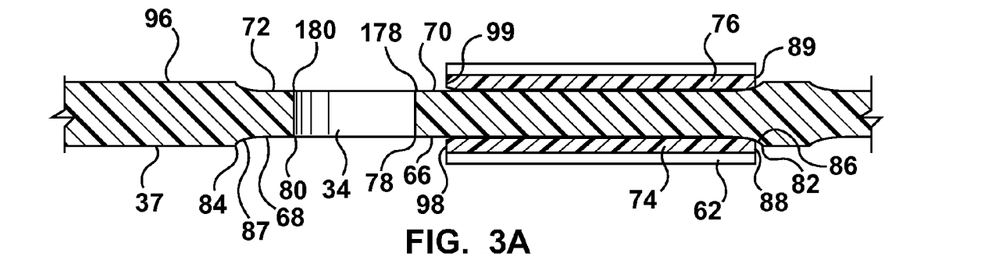
FIG. 3A is a longitudinal cross-section showing an embodiment of the invention showing an aperture and the latch member in an open position, taken along 3A-3A and drawn at a larger scale.
Figure 3B:
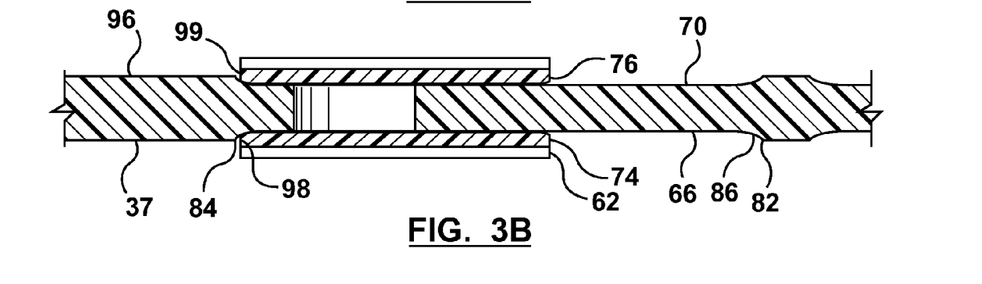
FIG. 3B is a longitudinal cross-section showing the latch member of FIG. 3A in a closed position relative to the aperture.

It will be understood that the aperture 34 shown in FIG. 3 is representative of all the apertures 34, and similarly, that the grooves 66, 68 shown in FIGS. 3, 3A, and 3B are representative of all of the grooves 66, 68 respectively.

The latch member 62 is also shown in FIGS. 3A, 3B, and 3C. As can be seen in FIGS. 3A and 3B, the latch member 62 is slidably movable in two of the grooves (i.e., 66, 68) between an open position (FIG. 3A), in which the aperture 34 is open to permit insertion and removal of the element 64, and a closed position (FIG. 3B), in which the latch member 62 at least partially obstructs the aperture 34. Preferably, the latch member 62 is moved between the open position (FIG. 3A) and the fully closed position (FIG. 3B), in which the latch member 62 prevents insertion and removal of the element 64 in the aperture 34.

Preferably, and as shown in FIGS. 3A, 3B, and 3C, the body includes additional grooves 70, 72 positioned on the rear side 96 which are substantially parallel to each groove 66, 68 respectively. The positioning of grooves 66, 70, and 68, 72 substantially parallel to each other permits the latch member 62 to have a simple structure (shown in cross-section in FIG. 3C) in which ledges 74, 76 of the latch member 62 are positionable in grooves 66, 68 and in grooves 70, 72 respectively (FIG. 3C). The structure of the latch member 62 shown in FIG. 3C is relatively easy to position in the grooves (i.e., when the apparatus 20 is assembled) and stable, i.e., the latch member 62 is not readily removable from engagement with the body 32, while at the same time the ledges 74, 76 are slidably receivable in the grooves 66, 68, and 70, 72 respectively.

As can be seen in FIGS. 3A and 3B, each of the grooves 66, 68 includes a first end 78, 80 which opens into the aperture 34, and a second end 82, 84 which is distal to the aperture 34. It can also be seen that the grooves 70, 72 also include first ends 178, 180 and second ends 182, 184 respectively corresponding to the first ends 78, 80 and the second ends 82, 84. In one embodiment, each second end 82, 84 includes a shallow portion 86, 87 respectively for engaging the latch member 62, to hold the latch member 62 in a preselected position. Such position is selected from the group consisting of the open position (shown in FIG. 3A, in which ends 88, 89 of the ledges 74, 76 are engaged with the shallow portions 86) and the fully closed position (shown in FIG. 3B, in which ends 98, 99 of the ledges 74, 76 are engaged with the shallow portions 87).

Preferably, and as shown in FIGS. 3A and 3B, the ends 88, 89 and 98, 99 are chamfered so that the ends tend to engage the shallow portions, when pushed into the shallow portions.

As can be seen in FIG. 1, each slot 34 includes an outer portion 101 disposed at an edge 103 of the body 32 and an inner portion 105 for receiving the element 64. As can be seen in FIG. 1, the inner portion 105 extends inwardly into the body 32 from the edge 103 thereof. When the latch member 62 is in the open position, the outer portion 101 is open to permit the element 64 to be received in the inner portion 105. When the latch member 62 is in the fully closed position, the latch member 62 prevents insertion and removal of the element 64 in the slot. Also, and as shown in FIG. 1, when the latch member 62 is in the fully closed position, the inner portion 105 is open, and is partially defined by the latch member 62.

Preferably, the body 32 is made of a relatively rigid plastic such as polyethylene or of any other suitable material. It is also preferred that the body 32 is formed by injection molding or any other suitable process. The fasteners also preferably are formed of any suitable material, and snap into place when the ledges 74, 76 are received in the grooves, so that the fasteners are not easily removed therefrom.

In use, the base 56 (or more than one base, as required) is attached to the appropriate apertures 34 in the body 32 (i.e., via insertion of mating portions 60 therein) to enable the user to position the body 32 relative to the back wall 28 as required by the user. As described above, the base 56 preferably is attached by inserting the mating portion 60 of the base 56 into the appropriate apertures 34. (In order to permit such insertion, the fasteners for the selected apertures are first moved to the open position.) After the mating portion 60 is inserted, the latch member 62 for each selected aperture 34 is moved to the fully closed position, in order to hold the mating portion 60 in each such aperture 34.

The cooperating portion 54 for the light source mounting element 40 of one light source assembly 38 is also inserted into a selected aperture 34, i.e., as selected by the user, to serve the user's purposes. It will be appreciated that any number of light source assemblies 38 could be used with a body 32. However, it is preferred that two light source assemblies 38 be used, as shown in FIG. 1. The cooperating portion 54 is inserted into the appropriate aperture 34, as selected by the user. (In order to permit such insertion, the latch member for the selected aperture is first moved to the open position.) After the cooperating portion 54 has been inserted into the aperture, the latch member 62 for the aperture 34 is moved to the fully closed position, in order to maintain the cooperating portion 54 positioned in the aperture 34. The operation is repeated at each aperture 34 in which the cooperating portions 54 of light source mounting elements 40 are to be positioned.

The user inserts cable bodies 23 into such apertures 34 respectively as the user wishes. Before an individual cable body 23 is moved into a selected aperture 34, the latch member 62 for the aperture 34 is moved to the fully open position (FIG. 3), until the cable body 23 has been moved in a generally transverse direction (i.e., transverse to the cable body) into the aperture 34. After the cable body 23 is positioned in the aperture 34, the latch member 62 is moved to the fully closed position, to maintain the cable body 23 positioned in the aperture 34.

When it is desired to disconnect or connect a specific cable 22 (e.g., the modem cable) to the appropriate connector, the user utilizes the reflective surface 36 to identify the appropriate connector on the back wall 28 of the electronic device 26 and the relevant plug portion 25. After having identified the location of the connector and/or the plug portion 25, the user then uses the reflective surface 36 to facilitate plugging or unplugging the cable 22 related to the specific peripheral component. Advantageously, according to the present embodiment, minimal disturbance is caused to the electronic device 26 when cables 22 are connected or disconnected.

As is known in the art, the plug portion 25 may have any of a variety of configurations, but the plug portion 25 typically has a diameter which is much larger than the diameter of the cable body 23 to which the plug portion 25 is attached, and larger than the inner portion 105 of the slot 34. When a particular cable 22 is disconnected, the end 24 thereof preferably is moved by the user to the aperture or slot 34 in which the cable body 23 is disposed. Preferably, the fastener 62 remains in the fully closed position, to keep the cable body 23 positioned in the aperture or slot 34, and specifically, keeping the cable body 23 in the inner portion 105 thereof. The plug portion 25 typically has a diameter which is sufficiently large that the plug portion 25 is not receivable in the inner portion 105. In practice, this is very useful, because the ends 24 of the cables 22 which have been disconnected from the electronic device 26 are held at the apparatus 20, conveniently positioned at their respective apertures 34, as a result. The ends 24 are then readily available for connection to the electronic device 26, when such connection is desired.

It will be understood by those skilled in the art that, in the absence of the apparatus 20, the ends 24 of disconnected cables 22 tend to fall behind a table or desk on which the electronic device 26 is positioned after the ends 24 have been disconnected. In these circumstances, the user's retrieval of the disconnected cables (i.e., when re-connection is desired) tends to be awkward and somewhat difficult, especially so if the appropriate cable end 24 for a particular peripheral device cannot be readily identified.

Preferably, labels (or identifiers) are placed on the fasteners 62 respectively, to identify the cable positioned in the aperture 34 for a particular fastener 62. The user may simply use the labels, or identifiers (placed on the fasteners either at the time of manufacture or upon setup of the cable organizing apparatus) to identify the specific cable that is to be manipulated and simply trace back that cable by hand to the respective connector located on the main processor housing 26.

The light source 38 is for use in combination with the reflective surface 36 to illuminate at least a portion of the back wall 28 of the electronic device 26, and for facilitating the connection of the cables 22 to the electronic device. For example, the positioning of the light source 38 can be adjusted to illuminate a relevant portion of the back wall 28 of the main processor housing 26. Thus, when attempting to connect or disconnect a specific cable from the back wall 28, the relevant connectors are illuminated so that the user can clearly see an image thereof in the reflective surface 36. Based on this observation, the user then proceeds to manipulate the cable connections in a desired manner. For example, as shown in FIG. 1, two light sources 38 may be positioned at the upper end of the body 32, allowing for improved illumination of the back wall 28 of the electronic device.

Preferably, the positioning of the body 32 is adjustable relative to the electronic device 26 so that the reflective surface 36 and the light source 38 cooperate to provide an optimal illumination angle and viewing area of the back wall 28 of the electronic device 26.

For the purposes hereof, it will be understood that an "electronic device" could be, for example, a desktop computer, a television set, a stereo receiver, or any other similar device. However, for illustrative purposes only, the description herein is generally directed to a desktop computer.

The cables 22 can be many different types of cables for connected different components to the electronic device (e.g., desktop computer). For instance, the components connected to the electronic devices could include a modem, a keyboard, speakers, multimedia systems, a mouse, a monitor, a fax machine, a printer, a scanner, and other components. Also, other types of cables, such as a power supply cable, may be accommodated in the apparatus 20.

Any element in a claim that does not explicitly state "means for" performing a specified function, or "step for" performing a specific function, is not to be interpreted as a "means" or "step" clause as specified in 35 U.S.C. § 112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. An apparatus for organizing a plurality of cables with respective bodies thereof connected to ends thereof for use with an electronic device with at least one back wall, said at least one back wall having a plurality of connectors with which said ends of said cables are connectable, the apparatus comprising:
    a body having a plurality of apertures for positioning each said cable body respectively in a predetermined arrangement;
    at least one reflective surface disposed on the body for use in inserting said ends of said cables in said connectors respectively on said at least one back wall;
    at least one light source for illuminating at least a portion of said at least one back wall for use with said at least one reflective surface to provide images of the connectors for facilitating connecting said ends with said connectors respectively;
    said at least one light source comprising a light source mounting element, for positioning said at least one light source to facilitate connecting said ends with said connectors;
    a plurality of fasteners, each said fastener being adapted for securing, in at least one of said apertures, an element selected from the group consisting of one of said cable bodies, the light source mounting element, and at least one mating portion of a base for supporting the body in a predetermined position relative to the electronic device; and
    a plurality of grooves disposed on the body, each said groove being positioned adjacent to and associated with each said aperture respectively, and each said fastener comprises a latch member, each said latch member being slidably receivable in said grooves associated with each said aperture respectively.

2. An apparatus according to claim 1 in which each said latch member is slidably movable in at least two of said grooves associated with one of said apertures between an open position, in which said one of said apertures is open to permit insertion and removal of the element, and a closed position, in which each said latch member at least partially obstructs said one of said apertures.

3. An apparatus according to claim 2 in which each said latch member is in a fully closed position when each said latch member prevents insertion and removal of the element in said one of said apertures.

4. An apparatus according to claim 3 in which said at least two of said grooves are disposed on opposite sides respectively of said one of said apertures.

5. An apparatus according to claim 4 in which each said groove comprises a first end opening into said one of said apertures and a second end disposed distal to said one of said apertures respectively.

6. An apparatus according to claim 5 in which each said second end comprises a shallow portion, for engaging each said latch member respectively, to hold each said latch member in a position selected from the group consisting of the open position and the fully closed position.

7. An apparatus for positioning a plurality of cables in a predetermined arrangement, said cables being associated with an electronic device comprising at least one back wall, each said cable having a body connected to at least one end of each said cable, said at least one back wall having a plurality of connectors with which said ends of said cables are connectable, the apparatus comprising:
    a body comprising a plurality of slots, each said slot comprising an outer portion disposed at an edge of the body and an inner portion for receiving said cable body, the inner portion extending inwardly into the body from the edge thereof;
    a plurality of latch members, each said latch member being associated with one of said slots, each said latch member being slidably connected to the body and movable between an open position, in which said outer portion of said one of said slots is open to permit said cable body to be received in the inner portion thereof, and a closed position, in which each said latch member at least partially obstructs the outer portion of said one of said slots; and
    at least one reflective surface disposed on the body to facilitate connecting said ends of said cables respectively with said connectors disposed on said at least one back wall.

8. An apparatus according to claim 7 in which each said latch member is in a fully closed position when each said latch member prevents insertion and removal of the element in said one of said slots.

9. An apparatus according to claim 7 additionally comprising at least one light source to illuminate at least a portion of said at least one back wall, to facilitate connecting said ends of said cables with said connectors disposed on said at least one back wall.

10. A method of arranging a plurality of cables for use with an electronic device comprising at least one back wall, each said cable having a cable body and at least one end, said at least one back wall having a plurality of connectors for receiving said ends of the cables, the method comprising:
    (a) providing a body comprising a plurality of apertures and at least one reflective surface thereon;

(b) placing the body behind said at least one back wall such that said at least one reflective surface is facing said at least one back wall;
(c) positioning each said cable body in a preselected one of said apertures respectively;
(d) using said at least one reflective surface to provide images of the connectors for facilitating alignment of said ends with said connectors;
(e) inserting said ends of said cables into said connectors respectively;
(f) providing a plurality of latch members, each said latch member corresponding to an associated one of said apertures, each said latch member being adapted for slidably engaging grooves on the body located adjacent to each said aperture respectively; and
(g) sliding at least one of said latch members from an open position, in which one of said cable bodies is receivable in said associated aperture, to a closed position, in which said latch member associated with said aperture holds said cable body in said aperture.

11. A method according to claim 10, further comprising:
(h) providing at least one light source;
(i) illuminating at least a portion of said at least one back wall of the electronic device with said at least one light source; and
(j) using said at least one light source in combination with said at least one reflective surface to facilitate alignment of said ends with said connectors respectively for connection therewith.

12. A method according to claim 11, further comprising:
(k) viewing reflected images of said connectors provided on said at least one reflective surface; and
(l) using said reflected images for disconnecting said ends of said cables from said connectors.

* * * * *